(12) United States Patent
Servida

(10) Patent No.: US 9,932,253 B2
(45) Date of Patent: Apr. 3, 2018

(54) APPARATUS FOR PURIFYING A FLUID AND METHOD FOR PURIFYING A FLUID, IN PARTICULAR BY MEANS OF THE AFORESAID APPARATUS

(71) Applicant: IDROPAN DELL'ORTO DEPURATORI S.r.l., Milan (IT)

(72) Inventor: Tullio Servida, Milan (IT)

(73) Assignee: IDROPAN DELL'ORTO DEPURATORI S.R.L., Milan (IT)

( * ) Notice: Subject to any disclaimer, the term of this patent is extended or adjusted under 35 U.S.C. 154(b) by 570 days.

(21) Appl. No.: 14/215,094

(22) Filed: Mar. 17, 2014

(65) Prior Publication Data
US 2015/0076001 A1   Mar. 19, 2015

(30) Foreign Application Priority Data

Mar. 15, 2013 (IT) .............................. PD2013A0065

(51) Int. Cl.
| | | |
|---|---|---|
| C02F 1/469 | (2006.01) | |
| B01D 61/48 | (2006.01) | |
| B01D 61/46 | (2006.01) | |

(52) U.S. Cl.
CPC ............ *C02F 1/4691* (2013.01); *B01D 61/46* (2013.01); *B01D 61/48* (2013.01); *C02F 1/4693* (2013.01);
(Continued)

(58) Field of Classification Search
CPC .................................................. C02F 1/4695
See application file for complete search history.

(56) References Cited

U.S. PATENT DOCUMENTS

| 5,026,465 A | * | 6/1991 | Katz | ...................... B01D 61/48 |
| | | | | 204/524 |
| 5,360,540 A | | 11/1994 | Andelman | |

(Continued)

FOREIGN PATENT DOCUMENTS

| EP | 0503651 | 9/1992 |
|---|---|---|
| EP | 1069079 | 3/1999 |

(Continued)

*Primary Examiner* — Ibrahime A Abraham
*Assistant Examiner* — Salil Jain
(74) *Attorney, Agent, or Firm* — Mark M. Friedman

(57) ABSTRACT

Apparatus for purifying a fluid, which comprises an ion absorption cell (2) traversed by a fluid to be treated (F1) containing cationic particles and/or anionic particles, provided with a containment structure (3) defining at its interior two operating chambers (4, 5) traversed by the fluid to be treated (F1), and each delimited by a respective electrode (10, 11) that can be power supplied to opposite polarities. Between the two operating chambers (4, 5), a third evacuation chamber (13) is interposed, containing a porous electrical conductor (18) traversed by a washing fluid (F2) and delimited by two opposite walls (16, 17) which together with the electrodes (10, 11) define the aforesaid operating chambers (4, 5). The aforesaid walls (16, 17) have at least one ion-selective area associated, which is susceptible to being traversed by charged particles with corresponding polarity contained in the two contiguous operating chambers (4, 5) subjected to the action of the electric field generated by the electrodes. The porous electrical conductor (18) is in turn susceptible to reduce the electric field inside the third evacuation chamber (13) such that the ion-selective areas of the walls of the third evacuation chamber (13) are capable of repelling the charged particles with corresponding polarity contained in the third evacuation chamber (13) and subjected to the action of the electric field reduced due to the shielding effect of the porous electrical conductor (18).

11 Claims, 7 Drawing Sheets

(52) U.S. Cl.
CPC ...... *C02F 1/4695* (2013.01); *C02F 2201/461* (2013.01)

(56) References Cited

U.S. PATENT DOCUMENTS

| | | | | |
|---|---|---|---|---|
| 6,284,124 | B1* | 9/2001 | DiMascio | B01D 61/48 204/533 |
| 6,413,409 | B1 | 7/2002 | Otowa et al. | |
| 7,591,933 | B2* | 9/2009 | Grebenyuk | B01D 61/46 204/260 |
| 2004/0178075 | A1* | 9/2004 | Sato | B01D 61/48 204/632 |
| 2012/0003176 | A1 | 2/2012 | Tadahiro OhmL et al. | |
| 2012/0031834 | A1* | 2/2012 | Higa | B01D 61/44 210/500.42 |
| 2014/0008227 | A1* | 1/2014 | Andersen | B01D 61/44 204/518 |

FOREIGN PATENT DOCUMENTS

| | | |
|---|---|---|
| JP | 2003145164 | 5/2003 |
| WO | 00/44477 | 8/2000 |
| WO | 2005/011849 | 2/2005 |
| WO | 2012/170192 | 12/2012 |

* cited by examiner

US 9,932,253 B2

APPARATUS FOR PURIFYING A FLUID AND METHOD FOR PURIFYING A FLUID, IN PARTICULAR BY MEANS OF THE AFORESAID APPARATUS

FIELD OF APPLICATION

The present invention regards an apparatus for purifying a fluid and a method for purifying a fluid, in particular by means of the aforesaid apparatus, according to the preamble of the respective independent claims.

More in detail, the apparatus and the method according to the invention are intended to be advantageously employed for removing ionized particles from a fluid, for the purpose of facilitating the recovery or removal of such particles. The latter can be typically constituted by ions of salts dissolved in a liquid or by metal ions, for example of industrial process fluids.

The present apparatus can be intended for multiple applications, both in industrial and civil fields, such as the desalination of sea water, the softening of particularly hard waters, the removal of salts (such as chlorides and sulfates) from water, as well as the removal from any liquid of, for example, nitrates, nitrites, ammonia, heavy metals, organic substances or micropollutants in general, or for the deionization of fluids, for example of industrial processes or for the concentration of polluting substances that are difficult to dispose of or advantageous to recover for a reuse.

The apparatus, object of the present invention, can also be incorporated in a machine, in particular for domestic use. In this case, it will allow purifying the water intended for such machine, allowing the latter to better achieve the functionalities for which it is used; such functions for example may include producing drinks, cleaning dishes, clothes etc.

The present invention is therefore generally inserted in the industrial field of the production of apparatuses for removing ionized particles from fluids.

STATE OF THE ART

Apparatuses are known for purifying fluids that exploit the principle of capacitive deionization for removing ionized particles from a fluid. Such apparatuses comprise at least one cell composed of an assembly of flow-through capacitors; the cell is more in detail formed by a plurality of superimposed electrodes, between which a flow of fluid to be purified is made to pass. The electrodes face each other and are charged with opposite polarities by a direct current power supply unit.

Operatively, such known apparatus provides for the alternation of operating steps, in which the ions present in the fluid are captured on the opposite electrodes, and regeneration steps, in which the ions accumulated on the electrodes are removed by means of a washing fluid.

The electrodes of the flow-through capacitors electrostatically absorb and release the ionic charge contaminants and actively participate in the process of deionization of the liquid to be treated.

The electrodes are also usually fed by collectors, for example made of graphite, and they are made of electrically conductive porous materials (e.g. typically made of carbon) in order to absorb high quantities of ionized particles on their surface.

Flow-through capacitors of the above-indicated known type are for example described in the U.S. Pat. No. 6,413,409 and U.S. Pat. No. 5,360,540.

The aforesaid operating and regeneration steps for the cells translate, with reference to the interaction between electrodes and ions, into the following operative steps:

a step for absorbing the ions on the porous surface of the carbon of the electrodes supplied with opposite voltages; the energy expended for such step is proportional to the quantity of ions that are captured;

a step of electrostatic liberation of the ions from the carbon of the electrodes, providing the latter with the previously absorbed quantity of charge, so as to neutralize the electrostatic attraction with the ions;

a step for moving away the ions that are no longer electrostatically bound, to outside the porous electrodes, by means of charging the ions with reversed polarity, with the consequent possibility to remove them from the cell by means of the passage of the washing liquid.

The apparatuses with flow-through capacitors, present on the market and which exploit the principle of capacitive deionization according to the cyclically repeated operative steps mentioned above, have proven in practice that they have numerous drawbacks.

A first drawback lies in the fact that the apparatuses with flow-through capacitors have intermittent and hence discontinuous operation, which strongly negatively affects their productive efficiency/output. Such drawback is intrinsic in the operating principle itself of such apparatuses that leads the cell to purify the fluid for a time that varies between 50 and 75% of its operation, which stems from the need to subject the electrodes to the different above-indicated steps in order to operate in different times and modes on the ions (absorbing them, neutralizing them, moving them away).

In addition, the alternation of the operating and regeneration steps leads to queues of diluted fluid that cannot be exploited and which contributes to further negatively affecting the performances of the cell.

A second drawback lies in the fact that within the cell, high salinity concentrations can be reached with the consequent precipitation of salts, and hence the formation of fouling. A widespread problem in the cells with flow-through capacitors indeed pertains to the need to prevent the solutes from precipitating between the electrodes of the capacitor, obstructing the fluid passage channels and thus rendering the cell useless in the long term.

It must also be considered that the capacity of the electrodes to capture the ions in solution, and more generally the charged particles, is a characteristic that positively affects the operation of the capacitor. Nevertheless, the ions, after having been captured by the electrodes in the operating step, must be easily releasable into the flow of the washing liquid of the regeneration step.

For such purpose, numerous different embodiments of electrodes have been developed aimed to attempt to optimize the physical and electrical relation between the surface of the same electrodes and the ions to be treated upon varying the abovementioned operative steps (absorption, liberation, moving away). For example, electrodes have been designed made of spongy active carbon, molded in the form of sheets or fibers, as described for example in the U.S. Pat. No. 6,413,409 or sheets of a mixture comprising PTFE as described for example in the U.S. Pat. No. 6,413,409.

However, it is clear that not all the obtained electrodes can have optimal efficiency, since it is always necessary to balance the opposing needs of first retaining, then releasing the ions, making compromises in the process.

Apparatuses for purifying fluids are known which exploit the principle of electrodialysis for removing ionized particles from a fluid. Through dialysis, it is possible to obtain the separation of positive and negative ions dissolved as solutes inside a solution, by the traversing of selectively-permeable membranes of anionic and cationic type.

In order to accelerate the dialysis phenomenon, rather slow, a direct potential difference is normally established by means of the application of electrodes with opposite sign, such that the ions are stimulated to migrate towards the electrode with charge opposite their own.

More in detail, the apparatuses for purifying a fluid by means of electrodialysis comprise a sequence of membranes alternately semi-permeable to cations and anions. Such membranes define parallel chambers; the aqueous solution to be purified is made to travel through these chambers. At the ends of the sequence of membranes, a potential difference is applied. Consequently, the ions migrate towards the electrode with opposite polarity, coming to form salt concentration chambers and salt dilution chambers. In other words, since the arrangement of the membranes is alternated with respect to their disposition to allow the ionic migration, the following come to be stabilized in the chambers: electrolyte trap compartments and purified solution (e.g. water) compartments.

The electrodialysis is thus based on the application of a direct electric field capable of forcing the ionic components to traverse the respective ion-selective and water-impermeable membranes.

A first drawback of the electrodialysis apparatuses lies in the fact that in order to prevent the staining of the semi-permeable membranes by the ions, it is necessary to use numerous expedients that can provide for filtering systems, the use of chemical agents, as well as temporary modifications in the operation of the electrodialysis apparatus, such as polarity reversal. All these expedients render the apparatus and its operation method complex and not very practical, such to require high, costly maintenance.

A second drawback of the electrodialysis apparatuses lies in the fact they are not adapted to treat fluids with low salinity, such to determine low conductivity in the fluid to be purified.

Otherwise, it is known to arrange paints on electrodes that are capable of making positive or negative ions selectively pass.

Apparatuses for purifying fluids are known which exploit the principle of electrodeionization for removing ionized particles from a fluid. Such apparatuses described in the patents WO 00/44477, WO 2012/170192, JP 2003145164, WO 2005/011849 comprise at least one ion absorption cell traversed by a fluid to be treated containing ionized particles and provided with a containment structure that defines at least one first operating chamber through which the fluid to be treated flows and provided with a first wall having a first electrode associated provided with a first polarity, at least one second operating chamber through which the fluid to be treated containing ionized particles flows and provided with a second wall having a second electrode associated that is provided with a second polarity opposite the first, at least one third chamber for evacuating the ionized particles interposed between the first and the second operating chamber through which a washing fluid flows and provided with a third and a fourth wall opposite each other. In addition, the third and the fourth wall delimit, alongside the first and the second wall, respectively the first and the second operating chamber. The third and the fourth wall each have at least one ion-selective area associated, susceptible to being traversed by ionized particles with corresponding polarity contained in the first and second operating chamber, which pass from the first and second operating chamber to the third evacuation chamber under the action of the electric field generated by the electrodes.

In accordance with the above-described prior apparatuses, the electric field always present in the third evacuation chamber between the third and the fourth wall acts on the ionized particles, pushing them to exit, in this manner reducing the efficiency of purification of the fluid to be treated.

PRESENTATION OF THE INVENTION

In this situation, the problem underlying the present invention is therefore to eliminate the abovementioned problems of the prior art, by providing an apparatus for purifying a fluid and a method for purifying a fluid, in particular by means of the aforesaid apparatus, which are capable of removing high quantities of ionized particles with a high capture efficiency.

Another object of the present invention is to provide an apparatus and a method for purifying a fluid, which are capable of removing the ionized particles with high energy efficiency.

Another object of the present invention is to provide an apparatus and a method for purifying a fluid, which are capable of removing the ionized particles with high efficiency/output.

Another object of the present invention is to provide an apparatus and a method for purifying a fluid, which are capable of purifying fluids contaminated by salts of different ionic species.

Another object of the present invention is to provide an apparatus and a method for purifying a fluid, which require a low consumption of washing liquid.

Another object of the present invention is to provide an apparatus for purifying a fluid that is simple and inexpensive to obtain and entirely reliable in operation.

Another object of the present invention is to provide an apparatus for purifying a fluid, which allows being employed in a versatile manner in different applications, for industrial processes as well as in machines for home use, in plants in civil field for the purification of water and in plants for the desalination of sea water.

BRIEF DESCRIPTION OF THE DRAWINGS

The technical characteristics of the finding, according to the aforesaid objects, are clearly found in the contents of the below-indicated claims and the advantages thereof will be clearer from the following detailed description made with reference to the enclosed drawings, which represent several merely exemplifying and non-limiting embodiments of the invention, in which:

DETAILED DESCRIPTION OF A PREFERRED EMBODIMENT

With reference to the set of drawings, reference number 1 indicates overall an embodiment of an apparatus for purifying a fluid, object of the present invention.

The apparatus 1, according to the invention, is adapted to be employed for removing ionized particles present in fluids, such particles susceptible of being affected by the presence of an electric field, such as ions in solution.

Hereinbelow, the term ionized particles will generically indicate any contaminant dissolved in a fluid F1 to be treated, capable of being attracted by an electrostatic field, such as in particular the ions dissolved in a fluid.

The apparatus 1 is therefore adapted to operate for the deionization of industrial process fluids and for the deionization of water, in particular for softening the water of the water supply system and for the desalination of sea water; it is particularly capable of removing, from its interior, salts in solution (such as chlorides and sulfates), nitrates, nitrites, ammonia, and other polarized contaminants of organic substances or micropollutants in general.

The apparatus 1 is also adapted to concentrate ionized particles within fluids, particularly of industrial processes, in order to facilitate the recovery or the disposal of such particles.

In addition, the apparatus 1 is also adapted to be integrated in apparatuses or machines, for example for home use, in order to previously treat the water from the latter employed for their various use functions.

Figure 1:
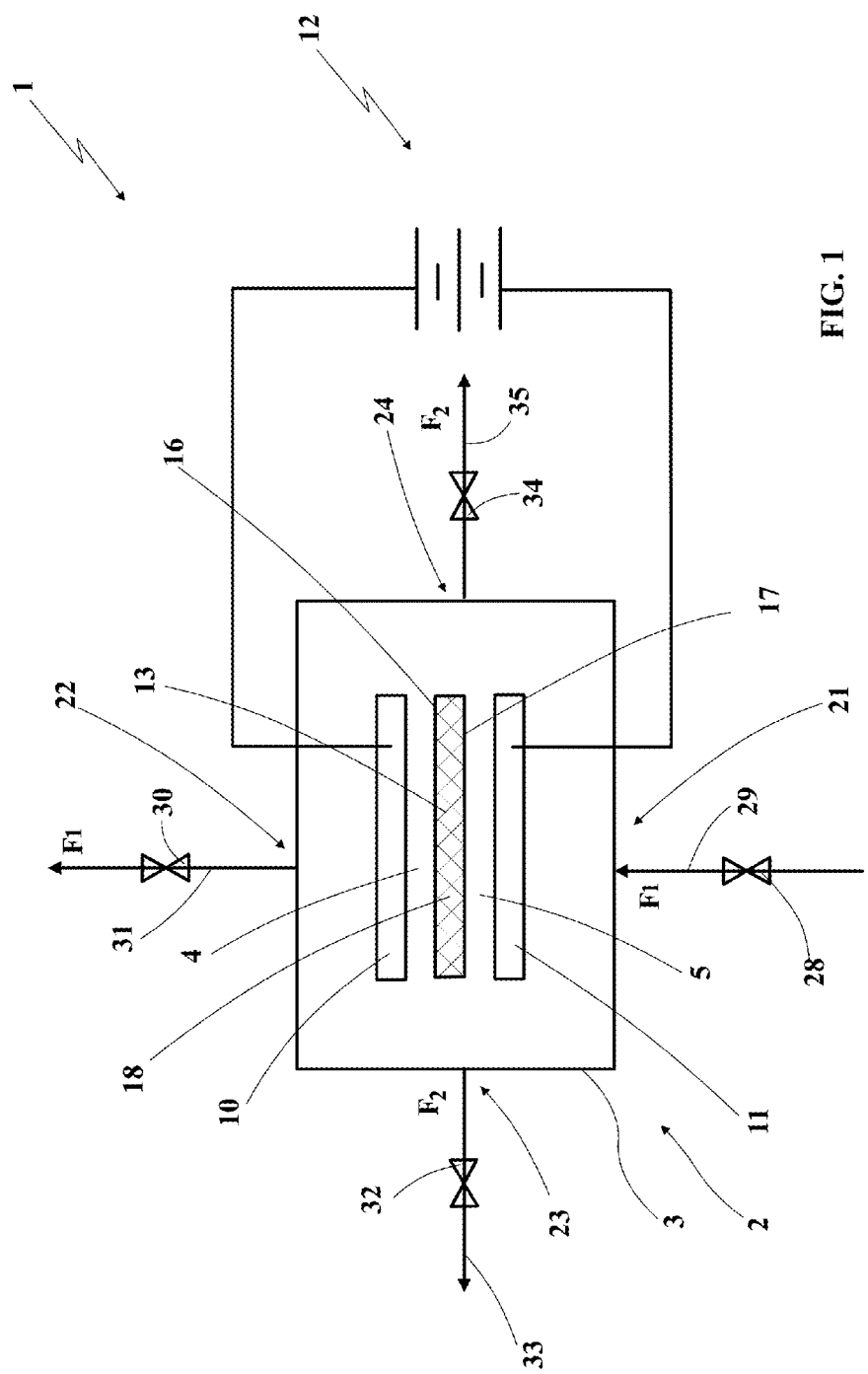
FIG. 1 shows a general electrical and hydraulic functioning scheme of the apparatus for purifying a fluid, according to the present invention.

In accordance with the present invention and with the scheme of the general FIG. 1, the apparatus 1 comprises at least one ion absorption cell 2, which is traversed by a fluid F1 to be treated containing cationic particles and/or anionic particles, such as water with high degree of mineralization, i.e. mineral salts dissolved therein, and in particular with high hardness or with high quantities of calcium and magnesium salts contained therein.

The apparatus can provide for multiple cells in series or parallel in a per se known manner in order to improve the purification of the fluid or treat high flow rates.

The aforesaid cell 1, illustrated in partial schematic form in the enclosed figures, is provided with a containment structure 3, e.g. made of plastic material, which at its interior contains at least the three chambers specified hereinbelow.

At least one first and one second operating chamber are provided for, respectively indicated with reference numbers 4 and 5; such chambers are respectively provided with a first and a second inlet opening 6, 7 and with a first and a second outlet opening 8, 9, through which the fluid F1 to be treated is susceptible to flow.

The aforesaid first and second operating chamber 4, 5 are respectively provided with a first and a second wall 10, 11 for containing the fluid to be treated, to which a first and a second electrode are correspondingly associated, which can be power supplied by an electrical power supply source 12 to a first and to a second polarity, opposite each other. The power supply source 12 will be adapted to provide the aforesaid negative and positive voltages to the aforesaid electrodes with direct power supply; with direct power supply, it is also intended an average direct power supply i.e. of pulsed type, having average value of the voltage respectively positive and negative. Advantageously, with the term average direct it is intended an electrical power supply having a voltage of pulsed type generated by a PWM control circuit and provided with an average value of the voltage proportional to the reference value of a pre-established direct supply voltage.

Advantageously, in accordance with a preferred but non-limiting embodiment of the present invention, the first and the second containment wall 10, 11 themselves attain the two electrodes, since they are constituted by a conductor material, such as graphite. For this reason, the electrodes will be indicated hereinbelow with the same reference numbers as the two containment walls 10, 11.

In accordance with the idea underlying the present invention, at least one third chamber 13 is provided for evacuating the cationic particles and/or anionic particles absorbed by the two operating chambers 4, 5. The aforesaid third chamber 13 is interposed between the first operating chamber 4 and the second operating chamber 5, and is provided with a third inlet opening 14 and with a third outlet opening 15, through which a washing fluid F2 flows.

The third chamber 13 is delimited by a third and a fourth wall 16, 17, substantially impermeable, parallel and opposite to each other, which separately delimit alongside the first wall 10 and the second wall 11 respectively the first operating chamber 4 and the second operating chamber 5.

With the term substantially impermeable it must be intended that there can be a flow leakage between the third evacuation chamber 13 and one or both operating chambers 4, 5 comprised between 0 and 20%.

Preferably the pressure in the third evacuation chamber 13 will be adjusted to a value less than that of the two operating chambers 4, 5 so as to prevent or limit a fluid leakage from such third evacuation chamber 13 to the two operating chambers 4,5.

Therefore, the above-described configuration of the cell 2 provides for making the washing fluid F2 flow into a third evacuation chamber 13 interposed contiguously between the two operating chambers 4, 5 where the fluid F1 to be treated transits; fluid F2 is separated from fluid F2 by means of the third and the fourth wall 16, 17 which are substantially impermeable to the fluid F1 and to the washing fluid F2 but which allow the selective traversing, under the action of the electric field generated by the electrodes 10, 11, of the ions contained in the fluid to be treated F1.

For such purpose, the third and the fourth wall 16, 17 each have one or more ion-selective areas associated, such areas susceptible of being traversed by charged particles with corresponding polarity contained in the first and in the second operating chamber 4 and 5; the action of the electric field generated by the electrodes 10, 11 acts on such particles. At the same time, the ion-selective areas are adapted to retain, within the same third evacuation chamber 13, the cationic particles or the anionic particles, even if with polarity corresponding to the membrane, keeping them inside the same third evacuation chamber, due to the small movement force induced thereon by the electric field when the charged particles are contained in the third evacuation chamber 13. With the term "corresponding polarity" it is intended to consider that the anionic ion-selective membrane is more easily permeable to anions than cations and vice versa the cationic ion-selective membrane is more easily permeable to cations than anions.

The electric field within the third evacuation chamber 13 is present in a very limited manner for the reasons reported hereinbelow.

Indeed, inside the third evacuation chamber 13, a porous electrical conductor 18 is contained that is susceptible of being traversed by the washing fluid F2. With the term electrical conductor it must be intended a material in which the passage of electrical current is due to the movement of electrons and not ions. This porous electrical conductor 18 is interposed between the third and the fourth wall 16, 17 and is in close electrical contact with the same third and the fourth wall 16, 17, thus reducing inside the third evacuation chamber 13 the electric field generated by the first and by the second electrode 10, 11. Such porous electrical conductor determines a shielding effect of the electric field for the volume subtended between the third and the fourth wall 16, 17 such that the charged particles contained in the third evacuation chamber 13 do not have the force to overcome the ion-selective areas, with low electrical resistivity, of the third and fourth wall 16, 17 even though they have corresponding polarity.

The ion-selective areas are a good electrical conductor and therefore extend the shielding outside the third evacuation chamber 13 up to the outer surface of the third and fourth separation wall 16, 17 with the fluid to be treated F1 that flows into the two operating chambers 4, 5 which of course has higher resistivity.

The aforesaid porous electrical conductor 18 is advantageously formed by at least one net made of conductive material, e.g. metal, in particular interposed as a spacer between the third and the fourth wall 16, 17. Such net is provided with a three-dimensional structure in order to allow the passage of the fluid in its same lying plane.

The ion-selective areas of the third and fourth wall 16, 17 are advantageously obtained with membranes selectively of anionic exchange type and of cationic exchange type, each of which can be extended for the entire area of an electrode or, otherwise, each can regard portions of both electrodes as will be clarified in the examples reported hereinbelow.

In accordance with a possible embodiment selection, the third and the fourth wall 16, 17 of the third evacuation chamber 13 each comprise a sheet-form support on which prints of ion-selective areas are provided, and in particular for example silk screens of ion-selective areas, obtained starting from anionic and cationic ion-selective paints, for example of the type described in the patent EP 2463242 in the paragraphs 18-28 enclosed here for reference purposes. Such anionic and cationic ion-selective areas thus obtained can each cover the entire extension of an electrode or they can regard adjacent portions with different ion-selectivity of each electrode, in accordance with the two embodiments specified hereinbelow.

The sheet-form support can for example be made with a TNT sheet of 10-30 grams per m$^2$, preferably electrically conductive, with the ion-selective areas—obtained by means of silk screen printing, or more generally by means of a printing process—preferably made of a material that is substantially electrically conductive.

Between the first wall 10 of the first operating chamber 4 and the third wall 16 of the third evacuation chamber 13, a first porous, isolating spacer separator 19 is preferably interposed, susceptible of being crossed and traversed in its extension by the fluid to be treated F1.

Analogously, between the second wall 11 of the second operating chamber and the fourth wall 17 of the third evacuation chamber 13, a second porous, isolator spacer separator 20 is preferably interposed, it too susceptible of being crossed and traversed by the fluid F1 to be treated.

The cell 2 mentioned above is advantageously obtained by means of a plurality of superimposed purification layers, affected upstream and downstream by a common hydraulic circuit as specified hereinbelow, and each comprising a first 4, a second 5 and a third chamber 13.

More in detail, the cell 2 is for such purpose provided with:
  a first supply volume 21 obtained in its containment structure 3, and adapted to supply, with the fluid to be treated F1, the first inlet opening 6 and the second inlet opening 7 respectively of the first and the second operating chamber 4, 5 of all the purification layers;
  a first extraction volume 22 obtained in its containment structure 3, and adapted to receive the treated fluid F1 from the first outlet opening 8 and from the second outlet opening 9 of the first and of the second operating chamber 4, 5 of the aforesaid purification layers;
  a second supply volume 23 obtained in the containment structure 3, which supplies with the washing fluid F2 the third inlet opening 14 of the third evacuation chamber 13 of the aforesaid purification layers;
  a second extraction volume 24 obtained in the containment structure 3, which receives the washing fluid from the third outlet opening 15 of the third evacuation chamber 13 of the aforesaid purification layers.

The electrical connection between the first and the second electrodes 10, 11 of each purification layer is obtained by means of terminals (not illustrated) that are connected to respective projections 25 externally projecting from the electrodes 10, 11 themselves; preferably the projections 25 of the positive and negative electrodes 10, 11 are extended on opposite sides of the respective electrodes 10, 11, or they are in any case spaced from each other.

The two supply liquids of the cell, i.e. the liquid to be treated F1 and the washing liquid F2, can also be constituted by the same liquid (e.g. water to be treated and washing water), even arranging a common supply.

The apparatus further comprises:
  a first solenoid valve 28 in the supply duct 29 to the first inlet volume 21;
  a second solenoid valve 30, or in its place a first manual adjustment tap, placed on the delivery duct 31 to the users and connected to the first extraction volume 22;
  a third solenoid valve 32 on the supply duct 33 of the washing fluid F2 connected to the second inlet volume 23;
  a fourth solenoid valve 34 on the drain duct 35, connected to the second extraction volume 24, or preferably in its place a second tap for adjustably varying the ratio between the fluid to be treated F1 and the washing fluid F2.

Figure 7:
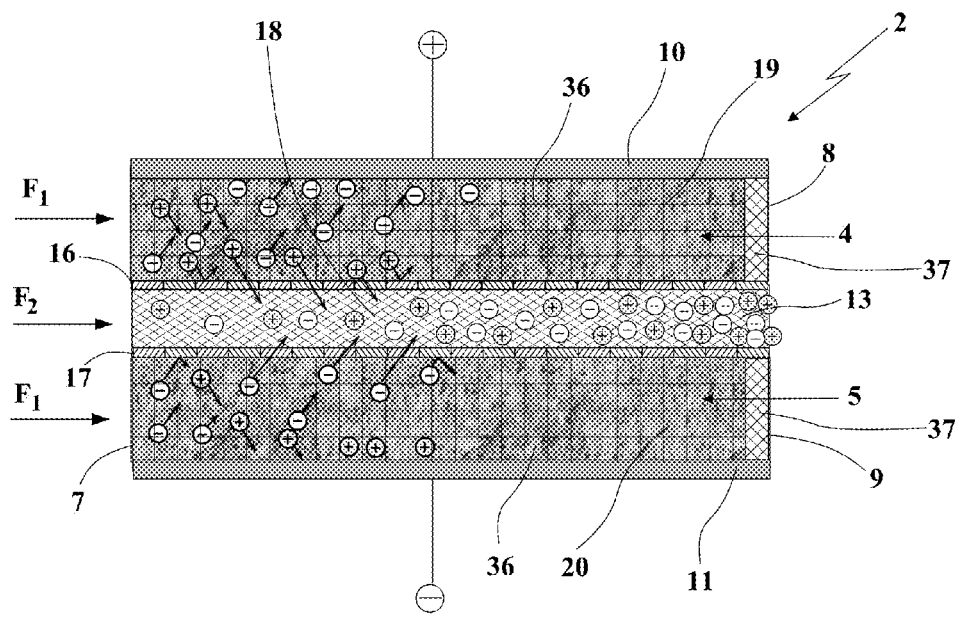
FIG. 7 shows a modified embodiment of the cell of FIG. 4A, relative to the first apparatus embodiment according to the invention.
Figure 8:
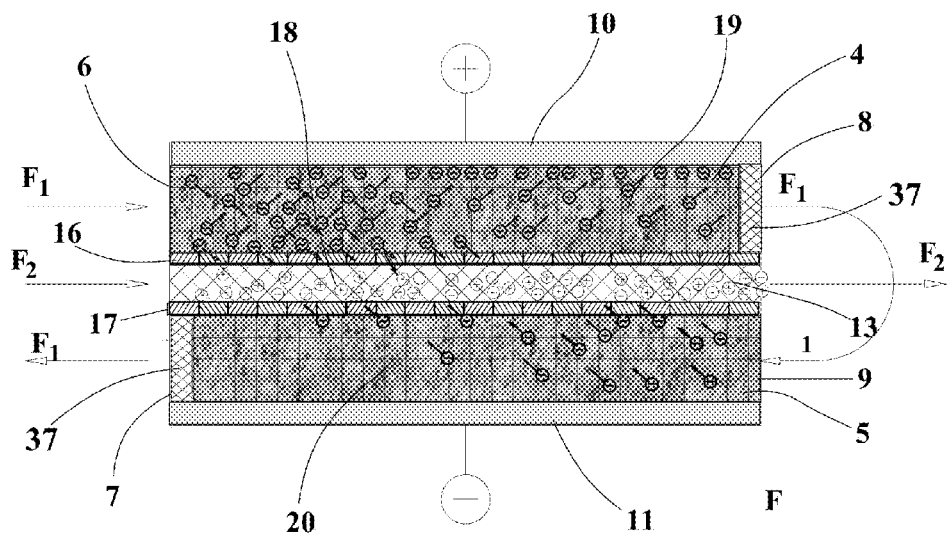
FIG. 8 shows a modified embodiment of the cell of FIG. 5, relative to the second apparatus embodiment according to the invention.

In accordance with a particular characteristic of the present invention illustrated in FIGS. 7 and 8, ion exchange resins 36 are provided, contained inside at least one of the two operating chambers 4 and 5 in order to interfere with the passage of the fluid to be treated F1. The resins are maintained inside the operating chamber without being evacuated from the fluid to be treated F1 by means of retention means 37.

Preferably, such ion exchange resins are of anionic and cationic type mixed together, both resin types preferably inserted in both the operating chambers 4, 5.

Preferably, the aforesaid retention means 37 are obtained with a porous separator, e.g. fixed to the operating chambers 4, 5 at the outlet opening 8, 9 thereof, susceptible of allowing the continuous passage of the fluid to be treated F1 and simultaneously of retaining the resins 36, preventing the exit thereof together with the fluid to be treated F1.

Operatively, the resins allow slowing the advancement of the cationic and anionic ions to the interior of the chambers together with the fluid to be treated F1, increasing the possibility that they will be electrostatically attracted towards the evacuation chamber 13. More in detail, the anionic and cationic resins 36 will be more greatly worn in proximity to the inlet openings 6, 7 of the operating chambers 4, 5, being able to retain a limited number of ions, while they will be more active towards the outlet openings 8, 9 where the ions are less numerous and where, therefore, due to their ion retention contribution, they allow the ions to have a greater possibility to cross the ion-selective areas and enter into the evacuation chamber 13.

Figure 2:
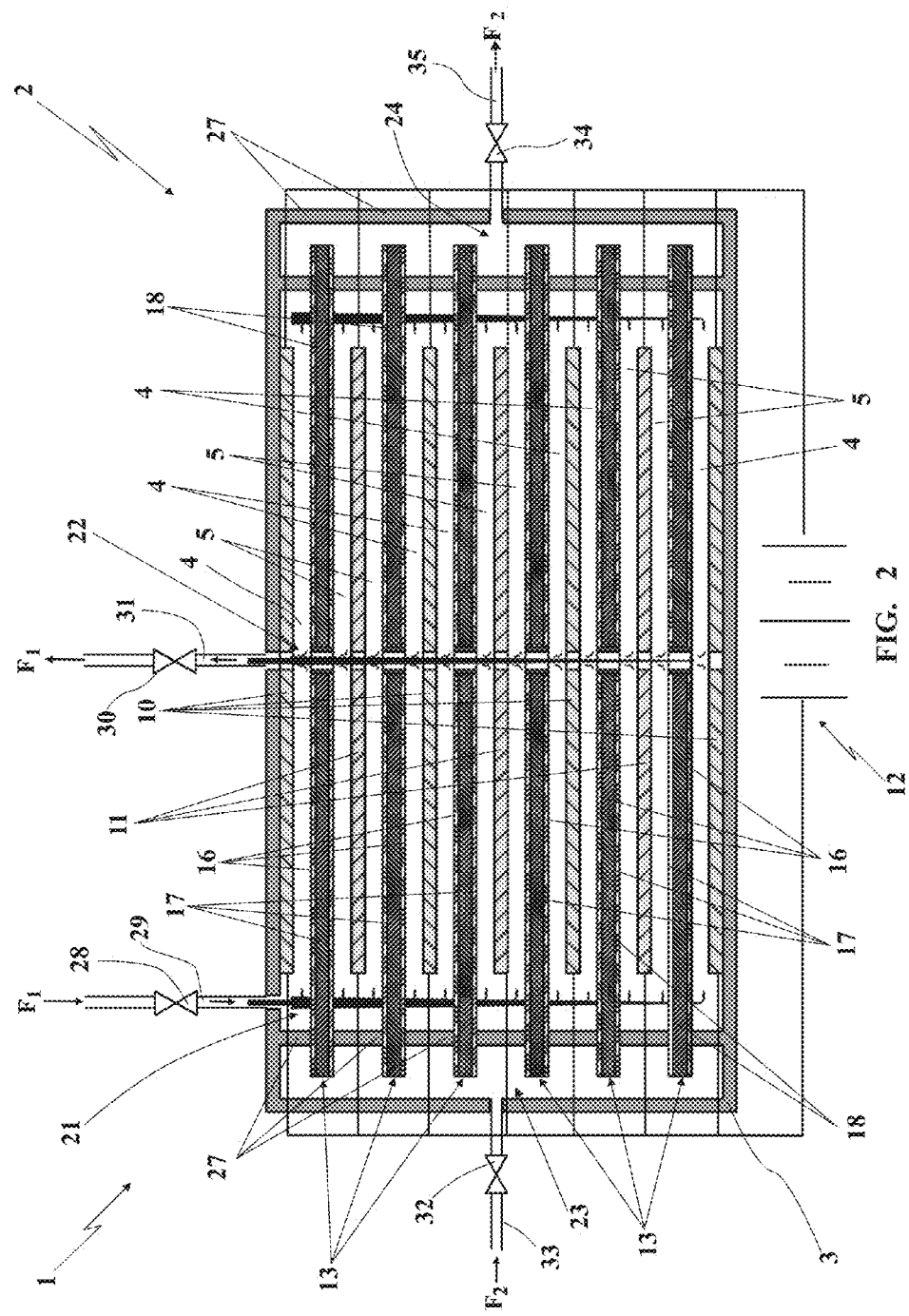
FIG. 2 schematically shows, in a cross section view, a first embodiment of the apparatus for purifying a fluid, according to the present invention.
Figure 3:
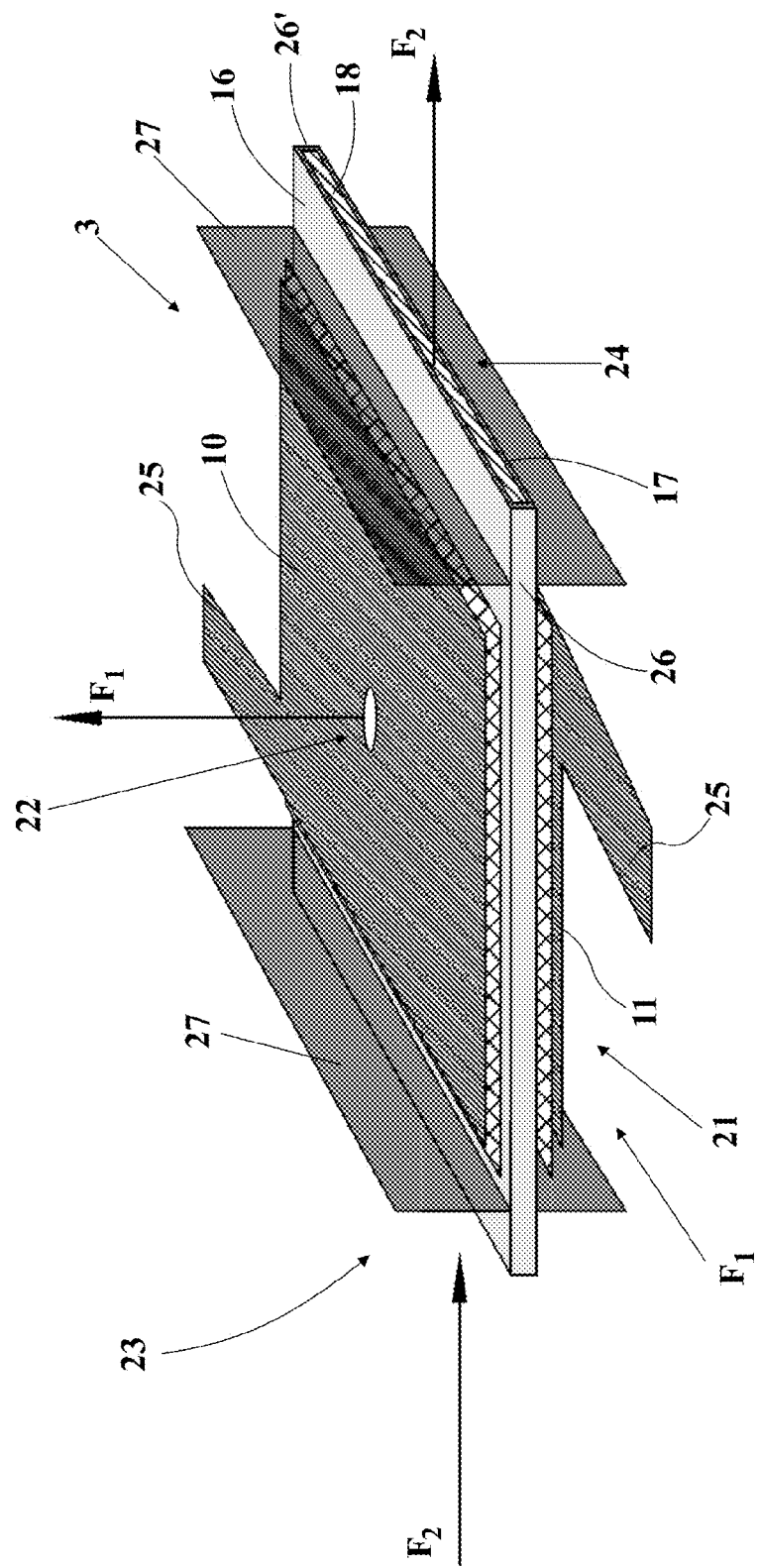
FIG. 3 schematically shows, in a perspective view, a portion of the cell of the apparatus for purifying a fluid of FIG. 2.
Figure 4:
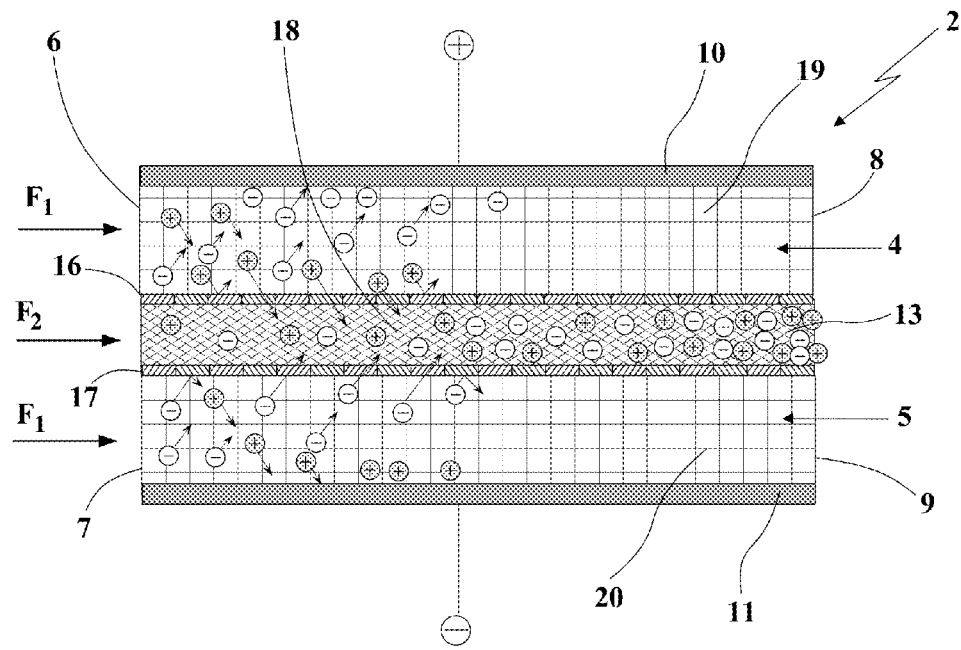
FIGS. 4A and 4B schematically show, in cross section view, a portion of the cell of the apparatus for purifying a fluid of FIG. 2 in two different operative moments.
Figure 4:
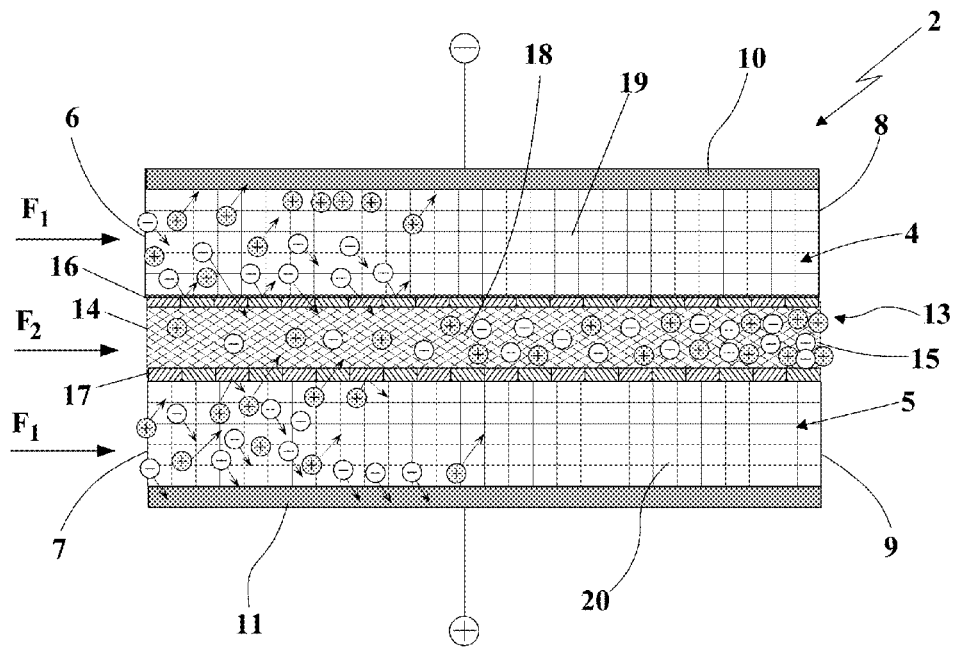

In accordance with a first embodiment of the present invention illustrated in the enclosed FIGS. 2, 3, 4 and 7, the third and the fourth wall 16, 17 are each provided with two or more adjacent ion-selective areas, and preferably with a plurality of adjacent ion-selective areas, respectively indicated with 16A, 16B and 17A, 17B, of which at least one is anionic 16A, 17A or cation-phobic (indicated with tilted lines rising towards the right in the enclosed FIGS. 4A, 4B) and at least one is cationic 16B, 17B or anion-phobic (indicated with tilted lines rising towards the left in the enclosed FIGS. 4A, 4B).

In accordance with such embodiment, i.e. in the presence of ion-selective areas with opposite polarity on each third and fourth wall 16, 17, the electrical power supply source 12 is advantageously susceptible of periodically reversing the polarities of the first and second electrode 10, 11 in order to force the cationic particles and the anionic particles contained in the first and second operating chamber 4, 5 to enter into the third chamber 13, by traversing the corresponding ion-selective area 16A, 16B and 17A, 17B.

Preferably, in accordance with the aforesaid embodiment, the polarity reversal frequency varies in an interval comprised between 0.5 Hz and 100 Hz.

In accordance with this embodiment, the two operating chambers 4, 5 are traversed in parallel by the fluid to be treated F1 since the anionic and cationic particles, due to the polarity reversal and to the presence of ion-selective areas with opposite polarity on each wall that delimits the third evacuation chamber 13, can enter into the latter chamber 13 in order to then be removed, whether they are coming from both the first or the second operating chamber 4, 5.

Of course, the single purification layer of the cell 2 schematized in FIGS. 3 and 4 can be repeated n times as illustrated in FIG. 2 in order to obtain a greater filtering action. In this case, preferably, as illustrated in the same FIG. 2, each intermediate electrode 10, 11 (excluding only the final electrodes) will act as a containment wall for two first operating chambers 4 or for two second operating chambers 5 of two adjacent and consecutive purification layers.

Preferably, moreover, the first extraction volume 22 is extended substantially transversely to the purification layers, preferably in a central zone of the chambers 4, 5, 13, traversing the first 10, the second 11, the third 16 and the fourth wall 17 with corresponding through holes.

Figure 5:
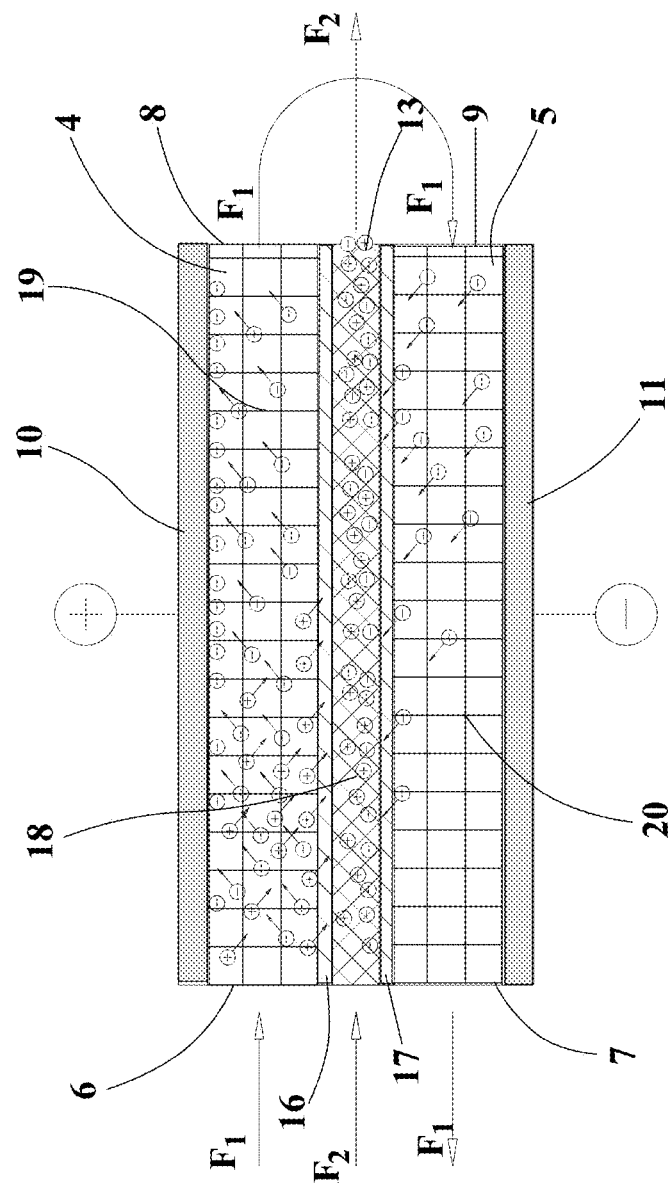
FIG. 5 schematically shows, in cross section view, a portion of the cell of a second embodiment of the apparatus for purifying a fluid according to the present invention.

In addition, in accordance with the embodiment characteristic illustrated in the detail of FIG. 5, the third evacuation chamber 13 is obtained in duct form and is for such purpose laterally closed with two lateral walls 26, 26' placed to join the third and the fourth wall 16, 17 at two opposite edges thereof so as to create a duct for conveying the evacuation fluid. The latter is preferably extended with its ends beyond provided separators 27, which delimit the extension of the first and second walls 4, 5 and separate the liquid to be treated F1, with which the first and the second chamber 4, 5 are supplied, from the washing liquid F2.

Figure 6:
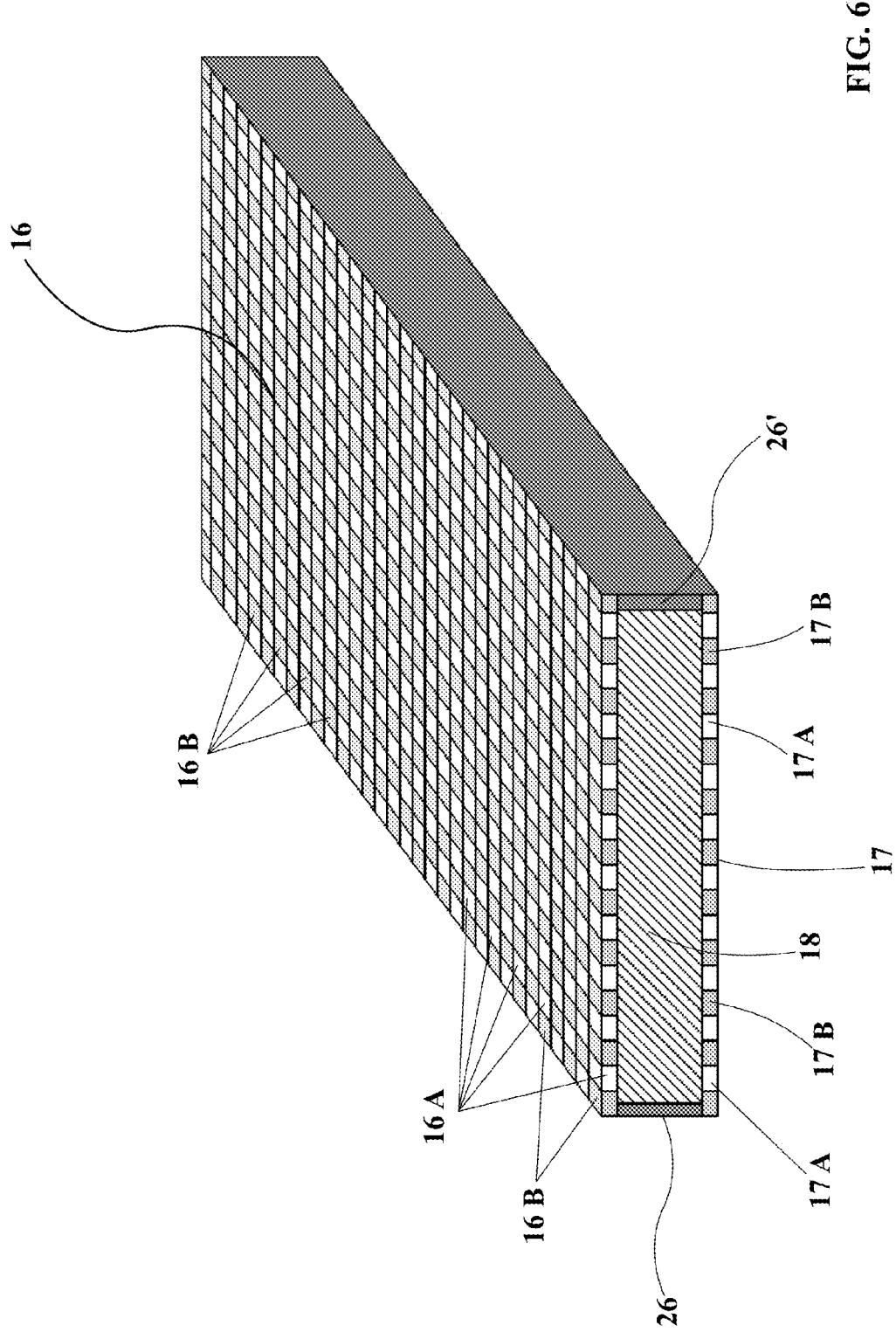
FIG. 6 schematically shows a detail of the apparatus for purifying a fluid, object of the present invention relative to an evacuation chamber with substantially equipotential volume of a cell of the apparatus.

Otherwise, in accordance with a second embodiment of the present invention illustrated in FIGS. 6 and 8, the ion-selective areas with opposite polarity are each associated with the entire extension of an electrode 10, 11. In this case, polarity reversal is not provided at the electrodes and the flow to be treated F1 sequentially traverses at least two operating chambers delimited by electrodes with opposite polarity in order to allow both the positive and negative ionic particles to traverse the ion-selective areas with corresponding polarity under the action of the electric field. For such purpose, the two operating chambers are traversed in countercurrent and are sequentially connected by connector sections made of electrically isolating material, indicated with dashed line in FIG. 6 and of course arranged in positions of the cell that are susceptible to not interfere with the walls 16, 17 that delimit the third evacuation chamber 13.

The apparatus described up to now mainly from the structural standpoint operates as specified hereinbelow, with reference to both embodiments.

The positively and negatively charged particles contained in the liquid to be treated F1, which continuously flow into the first and second chamber 4, 5, are forced by the action of the electric field produced by the two electrodes 10, 11 to migrate respectively towards the cathode (negative electrode) and towards the anode (positive electrode). In such migration, the positive cationic particles contained in the fluid of the operating chamber opposite that delimited by the cathode (first operating chamber 16 in accordance with FIG. 4A) and the negative anionic particles contained in the fluid of the operating chamber opposite that delimited by the anode (second operating chamber 17 in accordance with FIG. 4A) which encounter the ion-selective areas, respectively cationic (16B) and anionic (17A) of the corresponding third wall 16 and fourth wall 17, are forced by the electric field to traverse them, overcoming the potential barrier, represented by the ion-selective area, until they enter into the third evacuation chamber 13.

Once they have entered into the third evacuation chamber 13, the charged particles are subjected here to a small action of the electric field, and thus they are no longer able to traverse the ion-selective areas of the third 16 and fourth wall 17, remaining confined in the substantially equipotential volume of the third chamber 13, before then being conveyed towards the drain by the washing fluid flow F2 which continuously advances in the third evacuation chamber 13.

Through the electric field present in the first and in the second chamber 4, 5, the charged particles present herein are then moved into a volume constituted by the third evacuation chamber 13 with reduced electric field, overcoming a check barrier allowed by the ion-selective areas of the same walls of the third chamber 13.

The porous electric layer 18, advantageously constituted in accordance with the abovementioned preferred embodiment by a metal net, determines the isopotentiality of the third chamber 13, like a Faraday cage, with shielding of the electric field in order to prevent conducting the charged particles to outside the same chamber 13 once they have entered inside.

Also forming an object of the present invention is a method for purifying a fluid, which can advantageously employ the above-described apparatus 1; for the sake of simplicity, the same reference numbers and nomenclature of the apparatus 1 will be maintained hereinbelow.

The aforesaid method, according to the idea underlying the present invention, provides for the following operations.

The continuous flow is provided of the fluid to be treated F1, containing cationic particles and anionic particles, through the first operating chamber 4 and the second operating chamber 5, as described above, from their respective first and second inlet openings 6, 7 to their first and second outlet openings 8, 9; also provided is the flow of a washing fluid F2 through the third evacuation chamber 13, as described above, from its third inlet opening 14 to its third outlet opening 15.

More in detail, in accordance with the first embodiment described above, the flow of the fluid to be treated F1 occurs in parallel in the various operating chambers 4, 5; otherwise, in accordance with the second embodiment described above, the flow of the fluid to be treated F1 occurs sequentially in at least two operating chambers delimited by electrodes with opposite polarity. The traversing sequence can provide for the passage of the fluid first through all or only a group of operating chambers with a first same polarity of the purification layers and then subsequently the passage of the fluid through all or only a group of operating chambers with the second polarity of the purification layers.

It is then provided, for both embodiments, to generate an electric field between the electrodes 10, 11 associated with the first and the second wall of the two operating chambers 4, 5 by means of direct voltage power supply, or average direct power supply, of the same electrodes with opposite polarities.

Thus, there is the migration of at least part of the cationic particles and/or anionic particles contained in the two operating chambers 4, 5 under the action of the electric field, during the flow of the fluid to be treated F1 into the aforesaid operating chambers 4, 5, with their movement from the first and from the second operating chamber 4, 5 to the third evacuation chamber 13, traversing the ion-selective areas with corresponding polarity under the action of the electric field generated by the electrodes 10, 11.

There follows the retention of the cationic particles and/or of the anionic particles that migrated into the third evacuation chamber 13, passing through the ion-selective areas provided for on the third and fourth wall 16, 17, due to the barrier action exerted by the same ion-selective areas towards the charged particles with corresponding polarity contained in the third evacuation chamber 13 and subjected therein to the action of the electric field reduced due to the shielding effect produced by the porous electrical conductor 18.

More in detail, in accordance with the first embodiment described above, in which multiple ion-selective areas are provided on both the third and fourth wall defining the third evacuation chamber 13, the generation of the electric field occurs with periodic reversal of the polarity at the electrodes 10, 11. Consequently, the migration forces the cationic particles and the anionic particles contained in the first and second operating chambers 4, 5 to enter into the third evacuation chamber 13 by traversing ion-selective areas provided adjacent on each third and fourth wall 16, 17, of which at least one is cation-phobic and at least one is anion-phobic.

The apparatus and the method thus conceived therefore attain the pre-established objects.

In particular, by providing for a continuous operation, the apparatus allows considerably increasing the efficiency/output with respect to apparatuses of known type operating in intermittent manner, such as the apparatuses with flow-through capacitors.

In addition, the apparatus according to the invention does not provide for forcing the charged particles against the ion-selective membranes, as instead is provided for by the apparatuses that employ the principle of electrodialysis; consequently, the apparatus, object of the present invention, does not lead to any particular obstruction of the ion-selective areas, i.e. it does not require costly maintenance work. The same net of the porous electrical conductor 18 is adapted to prevent the obstruction of the walls 16, 17 that it spaces and on which ion-selective areas are obtained.

Inside the evacuation chamber 13, both ionic species absorbed from the contiguous operating chambers 4, 5 are found, so that excessively acidic or alkaline solutions are not obtained, i.e. fouling problems are avoided. This is particularly in accordance with the first embodiment described above, since the presence of a plurality of ion-selective areas does not allow the development of considerable variations in the ionic balance of the fluid to be treated.

The components employed by the apparatus, object of the present invention, such as the silk screens, allow obtaining cells at extremely limited costs.

Given that double layers of ionization are not provided for, as in the apparatuses with flow-through capacitors, it is not necessary to provide high current peaks with the power supply source, and consequently it is not necessary to employ costly electronics.

Of course, the apparatus in the practical attainment thereof can also assume shapes and configurations that are different from that illustrated above, without departing from the present protective scope.

In addition, all details can be substituted by technically equivalent elements and the size, shapes and materials employed can be of any type as required.

The invention claimed is:

1. Apparatus for purifying a fluid comprising:
   at least one ion absorption cell (2) traversed by a fluid to be treated (F1) containing cationic particles and/or anionic particles, provided with a containment structure (3) defining at its interior:
   at least one first operating chamber (4) provided with:
   a first inlet opening (6) and a first outlet opening (8), through which said fluid to be treated (F1) is susceptible to flow,
   at least one first wall (10) for containing said fluid to be treated (F1), having a first electrode associated that can be power supplied by an electrical power supply source (12) to a first polarity;
   at least one second operating chamber (5) provided with:
   a second inlet opening (7) and a second outlet opening (9), through which said fluid to be treated (F1) flows,
   at least one second wall (11) for containing said fluid to be treated (F1), having a second electrode associated that can be power supplied by said electrical power supply source (12) to a second polarity opposite the first;

at least one third evacuation chamber (13) for evacuating said cationic particles and/or anionic particles, which is:
  interposed between said first and second operating chamber (4, 5);
  provided with a third inlet opening (14) and a third outlet opening (15), through which a washing fluid (F2) flows,
  delimited by a third and a fourth wall (16, 17), substantially impermeable to said fluid to be treated F1 and to said washing fluid F2, opposite each other, which, alongside said first wall (10) and said second wall (11), respectively further delimit said first operating chamber (4) and said second operating chamber (5);
  said third and fourth wall (16, 17) each having associated at least one ion-selective area that is susceptible to being traversed by charged particles with corresponding polarity contained in said first and second operating chamber (4, 5), and the action of the electric field generated by said electrodes acting on such particles;
  said third evacuation chamber (13) comprising a porous electrical conductor (18) interposed between said third and fourth wall (16, 17) and traversed by said washing fluid (F2), said porous electrical conductor (18) being susceptible to reduce, inside said third evacuation chamber (13), the electric field generated by said first and second electrode; the ion-selective areas of said third and fourth wall (16, 17) being susceptible to achieve a barrier against the charged particles with corresponding polarity contained in said third evacuation chamber (13) and subjected to the action of said electric field reduced by said porous electrical conductor (18), such that the charged particles contained in said third evacuation chamber (13) do not have the force to overcome the ion-selective areas of said third and fourth wall (16, 17) even though they have corresponding polarity;
wherein, said third and fourth wall (16, 17) are each provided with two or more adjacent ion-selective areas (16A, 6B, 17A, 17B), of which at least one is cation-phobic and at least one anion-phobic;
wherein said electrical power supply source (12) is configured to periodically reverse the polarities of said first and second electrode with a polarity reversal frequency in an interval between 0.5 Hz and 100 Hz, in order to force said cationic particles and said anionic particles contained in said first and second operating chamber (4, 5) to enter into said third evacuation chamber (13) through said corresponding ion-selective areas (16A, 16B, 17A, 17B).

2. Apparatus for purifying a fluid according to claim 1, wherein the third and fourth wall (16, 17) of said third evacuation chamber (13) comprise a sheet-form support, in which the ion-selective areas (16A, 16B, 17A, 17B) are silk screens of ion-selective paints or prints of ion-selective paints.

3. Apparatus for purifying a fluid according to claim 2, comprising:
  at least one ion absorption cell (2) traversed by a fluid to be treated (F1) containing cationic particles and/or anionic particles, provided with a containment structure (3) defining at its interior;

at least one first operating chamber (4) provided with:
  a first inlet opening (6) and a first outlet opening (8), through which said fluid to be treated (F1) is susceptible to flow,
  at least one first wall (10) for containing said fluid to be treated (F1), having a first electrode associated that can be power supplied by an electrical power supply source (12) to a first polarity;
at least one second operating chamber (5) provided with:
  a second inlet opening (7) and a second outlet opening (9), through which said fluid to be treated (F1) flows,
  at least one second wall (11) for containing said fluid to be treated (F1), having a second electrode associated that can be power supplied by said electrical power supply source (12) to a second polarity opposite the first;
at least one third evacuation chamber (13) for evacuating said cationic particles and/or anionic particles, which is:
  interposed between said first and second operating chamber (4, 5);
  provided with a third inlet opening (14) and a third outlet opening (15), through which a washing fluid (F2) flows,
  delimited by a third and a fourth wall (16, 17), substantially impermeable to said fluid to be treated F1 and to said washing fluid F2, opposite each other, which, alongside said first wall (10) and said second wall (11), respectively further delimit said first operating chamber (4) and said second operating chamber (5);
  said third and fourth wall (16, 17) each having associated at least one ion selective area that is susceptible to being traversed by charged particles with corresponding polarity contained in said first and second operating chamber (4, 5), and the action of the electric field generated by said electrodes acts on such particles;
said third evacuation chamber (13) comprising a porous electrical conductor (18) interposed between said third and fourth wall (16, 17) and traversed by said washing fluid (F2), said porous electrical conductor (18) being susceptible to reduce, inside said third evacuation chamber (13), the electric field generated by said first and second electrode; the ion-selective areas of said third and fourth wall (16, 17) being susceptible to achieve a barrier against the charged particles with corresponding polarity contained in said third evacuation chamber (13) and subjected to the action of said electric field reduced by said porous electrical conductor (18), such that the charged particles contained in said third evacuation chamber (13) do not have the force to overcome the ion-selective areas of said third and fourth wall (16, 17) even though they have corresponding polarity;
wherein the third and fourth wall (16, 17) of said third evacuation chamber (13) comprise a sheet-form support, in which the ion-selective areas (16A, 163, 17A, 17B) are silk screens of ion-selective paints or prints of ion-selective paints;
wherein said ion-selective silk screen or print areas (16A, 16B, 17A, 17B) are a plurality of areas each of which is placed in adjacent position with an area having opposite ion-selectivity.

4. Apparatus for purifying a fluid according to claim 1, wherein the ion-selective areas (16A, 16B, 17A, 17B) of said third and fourth wall (16, 17) are obtained with membranes selectively of anionic exchange type and cationic exchange type.

5. Apparatus for purifying a fluid according to claim 1, wherein, between the first wall (10) of said first operating chamber (4) and the third wall (16) of said third evacuation chamber (13), at least one first isolating porous spacer separator (19) is interposed, susceptible to being traversed by said fluid to be treated (F1), and between the second wall (11) of said second operating chamber (5) and the fourth wall (17) of said third evacuation chamber (13) at least one second isolating porous spacer separator (20) is interposed, susceptible to being traversed by said fluid to be treated (F1).

6. Apparatus for purifying a fluid according to claim 1, wherein the porous electrical conductor (18) of said third evacuation chamber (13) comprises at least one net made of conductive material, interposed as spacer between said third and fourth wall (16, 17).

7. Apparatus for purifying a fluid according to claim 1, wherein it comprises at least one ion exchange resin (36) contained inside at least one of said first and second operating chambers (4, 5) in order to interfere with the passage of said fluid, to be treated (F1), and maintained here therein by means of retention means (37).

8. Apparatus for purifying a fluid according to claim 1, wherein said cell (2) further comprises:
a plurality of superimposed purification layers, each comprising a first, a second and a third chamber (4, 5, 13);
a first supply section volume (21) provided in said containment structure (3), which supplies the fluid to be treated (F1) to the first inlet opening (6) and the second inlet opening (7) of said first and second operating chamber (4, 5) of the aforesaid purification layers;
a first extraction section volume (22) provided in said containment structure (3), which receives the treated fluid from the first outlet opening (8) and from the second outlet opening (9) of said first and second operating chamber (4, 5) of the aforesaid purification layers;
a second supply section volume (23) provided in said containment structure (3), which supplies the washing fluid (F2) to the third inlet opening (14) of said third evacuation chamber (13) of the aforesaid purification layers;
a second extraction section volume (24) provided in said containment structure, which receives the washing fluid (F2) from the third outlet opening (15) of said third evacuation chamber (13) of the aforesaid purification layers.

9. Apparatus for purifying a fluid according to claim 8, wherein said second extraction section (24) first extraction volume (22) provided in said containment structure (3), is disposed substantially transversely to said purification layers, in a central zone of said chambers (4, 5, 13), traversing said first, second, third and fourth wall walls (10, 11, 16, 17) with corresponding through holes.

10. Apparatus for purifying a fluid according to claim 8, wherein the first and second electrodes of each said purification layer is are provided with a projection projections (25) externally projecting from the electrodes for the connection with said electrical power supply source (12).

11. Apparatus for purifying a fluid according to claim 1, comprising:
at least one ion absorption cell (2) traversed by a fluid to be treated (F1) containing cationic particles and/or anionic particles, provided with a containment structure (3) defining at its interior:
at least one first operating chamber (4) provided with:
a first inlet opening (6) and a first outlet opening (8), through which said fluid to be treated (F1) is susceptible to flow,
at least one first wall (10) for containing said fluid to be treated (F1), having a first electrode associated that can be power supplied by an electrical power supply source (12) to a first polarity;
at least one second operating chamber (5) provided with:
a second inlet opening (7) and a second outlet opening (9), through which said fluid to be treated (F1) flows,
at least one second wall (11) for containing said fluid to be treated (F1), having a second electrode associated that can be power supplied by said electrical power supply source (12) to a second polarity opposite the first;
at least one third evacuation chamber (13) for evacuating said cationic particles and/or anionic particles, which is:
interposed between said first and second operating chamber (4, 5);
provided with a third inlet opening (14) and a third outlet opening (15), through which a washing fluid (F2) flows,
delimited by a third and a fourth wall (16, 17), substantially impermeable to said fluid to be treated F1 and to said washing fluid F2, opposite each other, which, alongside said first wall (10) and said second wall (11), respectively further delimit said first operating chamber (4) and said second operating chamber (5);
said third and fourth wall (16, 17) each having associated at least one ion-selective area that is susceptible to being traversed by charged particles with corresponding polarity contained in said first and second operating chamber (4, 5), and the action of the electric field generated by said electrodes acts on such particles;
said third evacuation chamber (13) comprising a porous electrical conductor (18) interposed between said third and fourth wall (16, 17) and traversed by said washing fluid (F2), said porous electrical conductor (18) being susceptible to reduce, inside said third evacuation chamber (13), the electric field generated by said first and second electrode; the ion-selective areas of said third and fourth wall (16, 17) being susceptible to achieve a barrier against the charged particles with corresponding polarity contained in said third evacuation chamber (13) and subjected to the action of said electric field reduced by said porous electrical conductor (18), such that the charged particles contained in said third evacuation chamber (13) do not have the force to overcome the ion-selective areas of said third and fourth wall (16, 17) even though they have corresponding polarity;
wherein said third evacuation chamber (13) is obtained in duct form and is laterally closed with two lateral walls (26, 26') parallel to a flow of the washing fluid (F2) and placed to join said third and fourth wall (16, 17) at two opposite edges thereof.

* * * * *